US009320010B2

(12) United States Patent
Segev

(10) Patent No.: US 9,320,010 B2
(45) Date of Patent: Apr. 19, 2016

(54) APPARATUS, SYSTEM AND METHOD OF ESTIMATING A LOCATION OF A MOBILE DEVICE

(71) Applicant: Intel Corporation, Santa Clara, CA (US)

(72) Inventor: Jonathan Segev, Tel Mond (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/140,360

(22) Filed: Dec. 24, 2013

(65) Prior Publication Data

US 2015/0181553 A1 Jun. 25, 2015

(51) Int. Cl.
*H04W 64/00* (2009.01)
*H04W 24/00* (2009.01)
(Continued)

(52) U.S. Cl.
CPC .................................. *H04W 64/003* (2013.01)

(58) Field of Classification Search
CPC ............... H04W 60/00; H04W 64/003; H04W 74/0891; H04W 56/002; H04W 84/12; H04W 4/02; H04W 64/00; H04W 72/1205; G01S 13/765; G01S 5/021; H04L 1/18
USPC ............... 370/252, 329, 338, 328; 455/456.1, 455/67.11, 422.1, 456.6, 457; 340/7.22, 340/10.1, 10.4, 7.21, 8.1
See application file for complete search history.

(56) References Cited

U.S. PATENT DOCUMENTS

| 6,252,543 B1 | 6/2001 | Camp |
| 6,845,239 B1 | 1/2005 | Sato et al. |
| 2008/0252528 A1 | 10/2008 | Shen et al. |

(Continued)

FOREIGN PATENT DOCUMENTS

WO 2010149796 A1 12/2010

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

(Continued)

*Primary Examiner* — Inder Mehra
(74) *Attorney, Agent, or Firm* — Shichrur & Co.

(57) ABSTRACT

Some demonstrative embodiments include apparatuses, systems and/or methods of estimating a location of a mobile device. For example, an apparatus may include a controller to control a mobile device to transmit a first message to a wireless communication station (STA) and to receive a first acknowledgement (ACK) message from the STA in response to the first message, when the mobile device is at a first location, wherein the controller to control the mobile device to transmit a second message to the STA and to receive a second ACK message from the STA in response to the second message, when the mobile device is at a second location, wherein the controller is to determine a distance difference between a first distance and a second distance based on a first round trip time and a second round trip time, the first distance being between the first location and the STA, the second distance being between the second location and the STA, wherein the first round trip time includes a round trip time of the first message and first ACK, and the second round trip time includes a round trip time of the second message and second ACK.

25 Claims, 6 Drawing Sheets

(51) Int. Cl.
*H04W 4/02* (2009.01)
*H04W 72/12* (2009.01)

(56) References Cited

U.S. PATENT DOCUMENTS

| | | | |
|---|---|---|---|
| 2009/0245105 A1* | 10/2009 | Ho | 370/231 |
| 2011/0183683 A1* | 7/2011 | Das et al. | 455/456.1 |
| 2013/0044612 A1* | 2/2013 | Hirsch | 370/252 |
| 2013/0072217 A1* | 3/2013 | Zhang et al. | 455/456.1 |
| 2013/0072220 A1 | 3/2013 | Zhang et al. | |
| 2014/0213193 A1* | 7/2014 | Zhang et al. | 455/67.11 |
| 2014/0269549 A1* | 9/2014 | Stephens et al. | 370/329 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.
Wi-Fi Alliance Technical Committee P2P Task Group; Wi-Fi Peer-to-Peer (P2P) Technical Specification; Version 1.2; Dec. 14, 2011; 160 pages.
Open Mobile Alliance, Secure User Plane Location Architecture, OMA-AD-SUPL-V2_0-20120417-A, Version 2.0, Apr. 17, 2012, 51 pages.
W3C, Geolocation API Specification, W3C Proposed Recommendation May 10, 2012, 18 pages.
Search Report & Written Opinion for International Application No. PCT/US2014/067005, mailed on Feb. 13, 2015, 10 pages.

* cited by examiner

APPARATUS, SYSTEM AND METHOD OF ESTIMATING A LOCATION OF A MOBILE DEVICE

TECHNICAL FIELD

Embodiments described herein generally relate to estimating a location of a mobile device.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem. This problem does not yet have a scalable solution with satisfactory precision.

One solution for indoor navigation includes a Time-of-Flight (ToF) measurement method. The ToF may be defined as the overall time a signal propagates from a first station, e.g., a user ("client") mobile device, to a second station, e.g., an access point (AP), and back to the first station. A distance between the first and second stations may be calculated based on the ToF value, for example, by dividing the ToF value by two and multiplying the result by the speed of light.

An estimated location of the first station may be determined by calculating two or more distances between the first station and two or more other stations, e.g., other APs, by utilizing a suitable method, e.g., a trilateration method.

The ToF measurement method may require a relatively increased power consumption.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
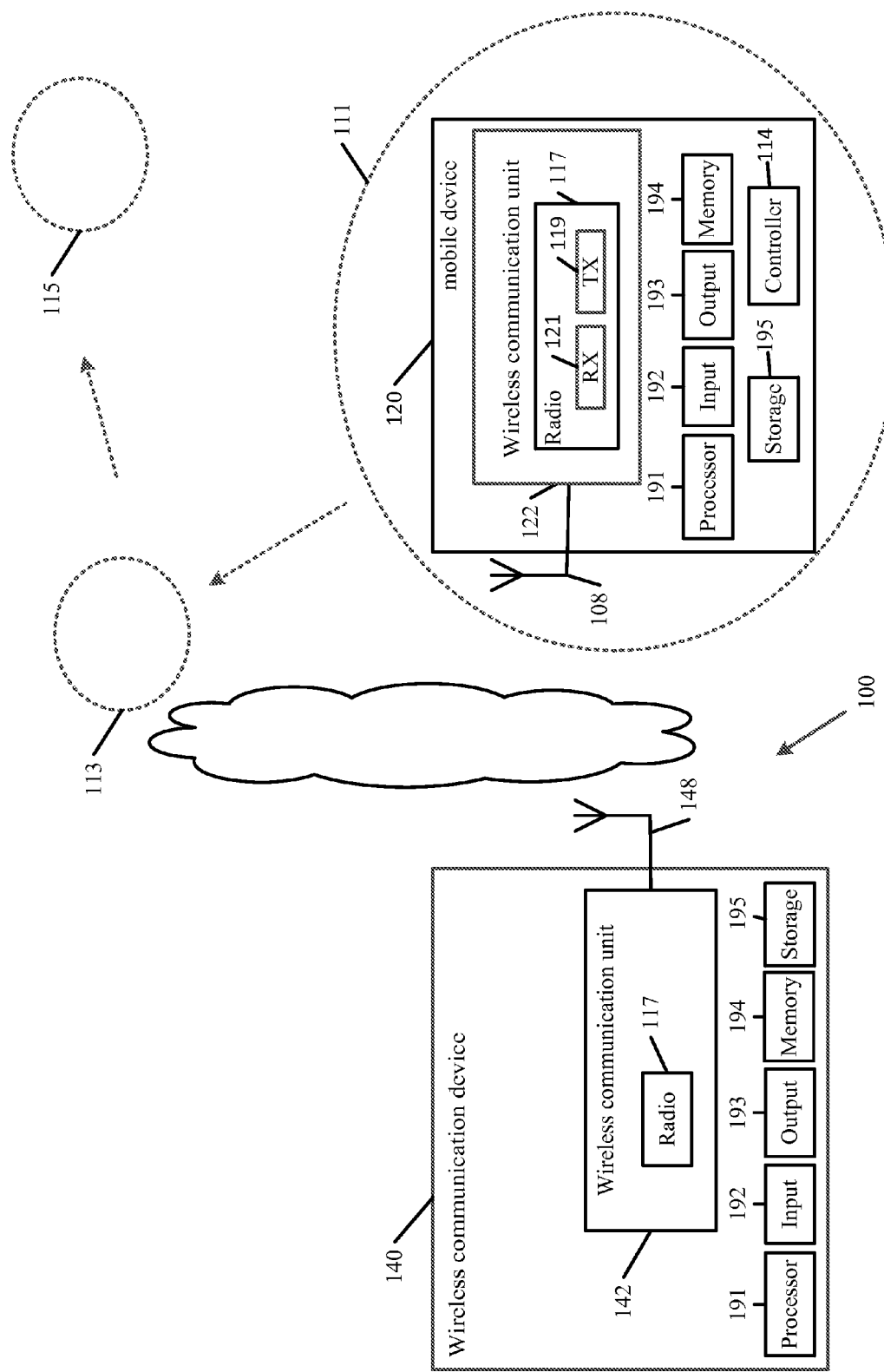
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE*802.11 *task group ac (TGac) ("IEEE*802.11-09/0308*r*12*—TGac Channel Model Addendum Document"); IEEE* 802.11 *task group ad (TGad) (IEEE P*802.11*ad-*2012*, IEEE Standard for Information Technology—Telecommunications and Information Exchange Between Systems—Local and Metropolitan Area Networks—Specific Requirements—Part* 11*: Wireless LAN*

Medium Access Control (*MAC*) *and Physical Layer* (*PHY*) *Specifications—Amendment* 3*: Enhancements for Very High Throughput in the* 60 *GHz Band,* 28 *Dec.,* 2012)) and/or future versions and/or derivatives thereof—devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Open Mobile Alliance (OMA) standards, including the Secure User Plane Location (SUPL) protocol (*SUPL-OMA-AD-SUPL-V*2.0) and/or future versions and/or derivatives thereof, devices and/or networks operating in accordance with existing World-Wide-Web Consortium (W3C) standards, including the *W*3*C Hypertext Markup Language* (*HTML*) *Version* 5*, October* 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Reference is now made to FIG. 1, which schematically illustrates a block diagram of a system 100, in accordance with some demonstrative embodiments.

As shown in FIG. 1, in some demonstrative embodiments system 100 may include one or more wireless communication devices capable of communicating content, data, information and/or signals via a wireless medium (WM) 103. For example, system 100 may include one or more mobile devices, e.g., a mobile device 120, and/or one or more wireless communication devices, e.g., wireless communication device 140.

In some demonstrative embodiments, system 100 may include one or more client STAs, and one or more APs. For example, device 120 may perform the functionality of a client STA and device 140 may perform the functionality of an AP, e.g., a WiFi AP, a router, a soft AP, a WiFi direct group owner, and the like.

In some demonstrative embodiments, device 140 may include a mobile or a non-mobile device, e.g., a static device.

In some demonstrative embodiments, device 140 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a context-aware device, a video device, an audio device, an A/V device, a Set-Top-Box (STB), a video source, an audio source, a video sink, an audio sink, a stereo tuner, a broadcast radio receiver, a flat panel display, a Personal Media Player (PMP), a data source, a data sink, or the like.

In some demonstrative embodiments, mobile device 120 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), a device that supports Dynamically Composable Computing (DCC), a wireless tag, a tracker device, a video device, an audio device, an A/V device, a gaming device, a media player, a Smartphone, or the like.

In some demonstrative embodiments, wireless medium 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, device 120 and/or device 140 may include wireless communication units, to perform wireless communication between device 120 and device 140 and/or with one or more other wireless communication devices over WM 103. For example, device 120 may include a wireless communication unit 122, and/or device 140 may include a wireless communication unit 142.

In some demonstrative embodiments, the wireless communication units may include one or more radios. For example, wireless communication unit 122 and/or wireless communication unit 142 may include a radio 117, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, filters, and/or the like. In one example, radio 117 may include at least one transmitter (Tx) 119 and at least one receiver (Rx) 121. For example, wireless communication units 122 and/or 142 may include or may be implemented as part of a wireless Network Interface Card (NIC), and the like.

In some demonstrative embodiments, the wireless communication units may include, or may be associated with, one or more antennas. For example, wireless communicate unit 122 may be associated with one or more antennas 108 and wireless communicate unit 142 may be associated with one or more antennas 148.

Antennas 108 and/or 148 may include any type of antennas suitable for transmitting and/or receiving wireless communication signals, blocks, frames, transmission streams, packets, messages and/or data. For example, antennas 108 and/or 148 may include any suitable configuration, structure and/or arrangement of one or more antenna elements, components, units, assemblies and/or arrays. Antennas 108 and/or 148 may include, for example, antennas suitable for directional communication, e.g., using beamforming techniques. For example, antennas 108 and/or 148 may include a phased array antenna, a multiple element antenna, a set of switched beam antennas, and/or the like. In some embodiments, antennas 108 and/or 148 may implement transmit and receive functionalities using separate transmit and receive antenna elements. In some embodiments, antennas 108 and/or 148 may implement transmit and receive functionalities using common and/or integrated transmit/receive elements.

In some demonstrative embodiments, mobile device 120 and/or device 140 may also include, for example, a processor 191, an input unit 192, an output unit 193, a memory unit 194, and a storage unit 195. Mobile device 120 may optionally include other suitable hardware components and/or software components. In some demonstrative embodiments, some or all of the components of mobile device 120 may be enclosed in a common housing or packaging, and may be interconnected or operably associated using one or more wired or wireless links. In other embodiments, components of mobile device 120 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of mobile device 120 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 120.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, device 120 and/or device 140 may be located in an indoor environment, for example, a mall, a building, an office and/or the like. In other embodiments, device 120 and/or device 140 may be located in any other environment, e.g., an indoor and/or an outdoor location.

In some demonstrative embodiments, mobile device 120 may estimate a location of mobile device 120 within the indoor environment based on a Time of Flight (ToF) measurement (also referred to as "Fine Time Measurement (FTM)").

The ToF may be defined as the overall time a signal propagates from a first station, e.g., device 120, to a second station, e.g., device 140, and back to the first station. A distance between the first and second stations may be determined based on the ToF value, for example, by dividing the ToF value by two and multiplying the result by the speed of light.

Figure 2:
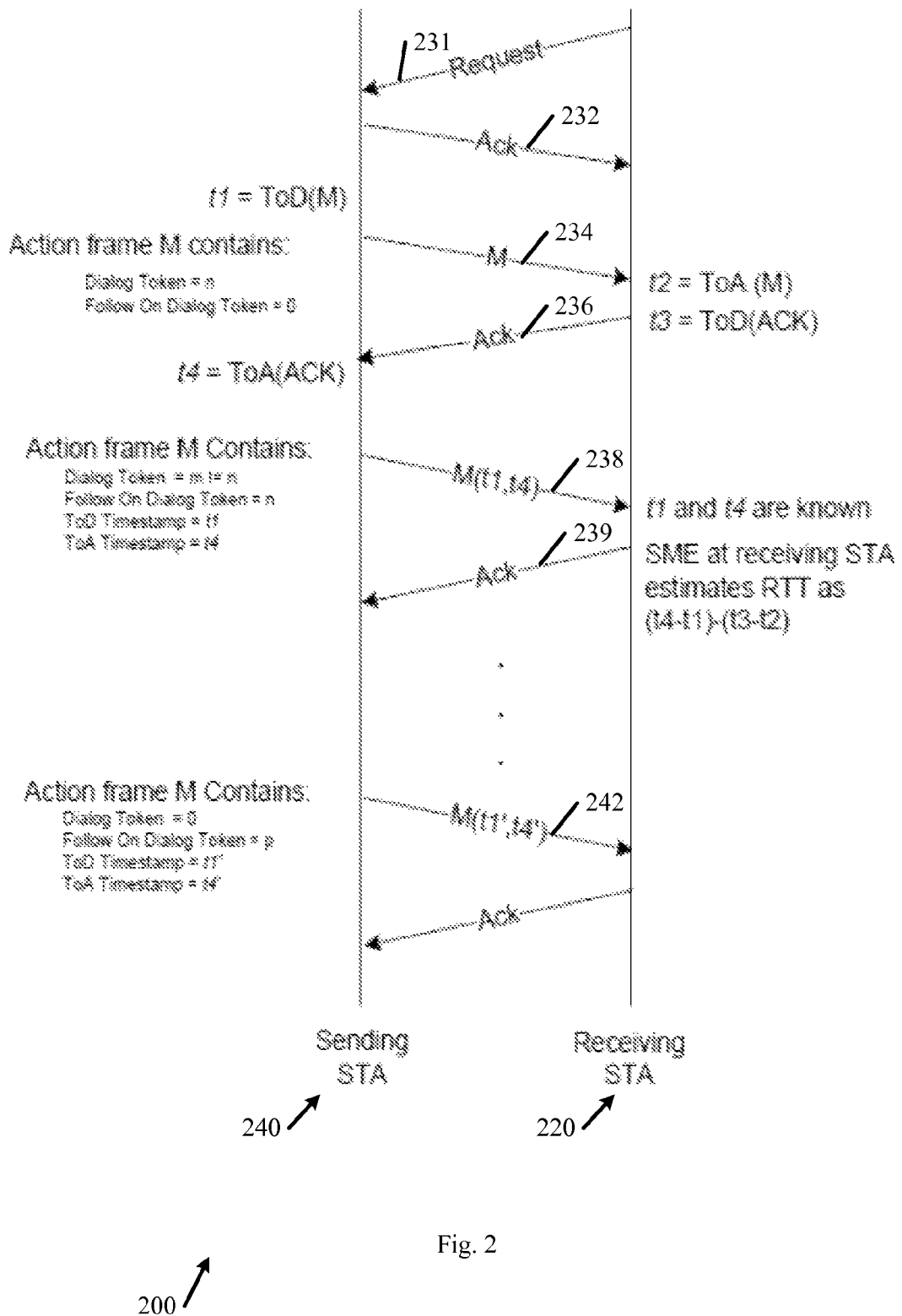
FIG. 2 is a schematic sequence diagram of operations and interactions between a mobile device and a wireless communication device, in accordance with some demonstrative embodiments.

Reference is made to FIG. 2, which schematically illustrates a sequence diagram, which demonstrates operations and interactions between a mobile device 220 (Receiving STA) and a device 240 (Sending STA), for performing an FTM procedure 200, in accordance with some demonstrative embodiments. For example, mobile device 220 may perform the functionality of mobile device 120 (FIG. 1) and/or device 240 may perform the functionality of device 140 (FIG. 1).

As shown in FIG. 2, device 220 may transmit to device 240 an FTM request message 231 to request to perform the FTM procedure 200 with device 240.

As shown in FIG. 2, device 240 may transmit an FTM request acknowledgement (ACK) 232 to device 220, to acknowledge receipt of the FTM request message 231, and to confirm the request to perform the FTM procedure.

As shown in FIG. 2, device 240 may transmit a message 234 to device 220, at a time, denoted t1. The time t1 may be a Time of Departure (ToD), denoted ToD(M), of message 234.

As shown in FIG. 2, device 220 may receive message 234 and may determine a time, denoted t2, e.g., by determining a Time of Arrival (ToA), denoted ToA(M), of message 234.

As shown in FIG. 2, device 220 may transmit a message 236 to device 240, at a time, denoted t3. Message 236 may include, for example, an acknowledgement message transmitted in response to message 234. The time t3 may be a ToD, denoted ToD(ACK), of the message 236.

As shown in FIG. 2, device 240 may receive message 236 and may determine a time, denoted t4, e.g., by determining a ToA, denoted ToA(ACK), of message 236.

As shown in FIG. 2, device 240 may transmit a message 238 to device 220. Message 238 may include, for example, information corresponding to the time t1 and/or the time t4. For example, message 238 may include a timestamp, e.g., a ToD timestamp, including the time t1, and a timestamp, e.g., a ToA timestamp, including the time t4.

As shown in FIG. 2, device 220 may receive message 238. Device 220 may determine a ToF between device 220 and device 240, for example, based on message 238.

For example, device 220 may determine the ToF based on an average, or any other function, applied to the time values t1, t2, t3 and t4. For example, device 220 may determine the ToF, e.g., as follows:

$$ToF=[(t4-t1)-(t3-t2)]/2 \quad (1)$$

As shown in FIG. 2, device 220 may transmit a message 239 to device 240. Message 239 may include, for example, an acknowledgement message transmitted in response to message M(t1,t4).

As shown in FIG. 2, devices 220 and 240 may continue to communicate one or more messages, e.g., as described above, to determine the ToF between device 220 and device 240, for example, based on a message 242.

In one example, devices 220 and 240 may continue to communicate the one or more messages to determine the ToF between device 220 and device 240, for example, if device 220 is in motion.

Referring back to FIG. 1, in some demonstrative embodiments, device 120 may determine the distance between devices 120 and 140 based on the calculated ToF.

For example, device 120 may determine the distance, denoted $r_k$, e.g., as follows:

$$r_k = ToF * C \quad (2)$$

wherein C denotes the radio wave propagation speed.

In some demonstrative embodiments, device 120 may determine a location of device 120, e.g., an absolute location or a relative location of device 120, based on the estimated distance $r_k$.

For example, device 120 may determine two or more ToF values, e.g., according to Equation 2, with respect to two or more other stations.

In some demonstrative embodiments, device 120 may determine the location of device 120 based on the two or more ToF values, e.g., by using trilateration techniques.

In some demonstrative embodiments, mobile device 120 may be moved from a first location 111 to a second location 113, for example, by a user of device 120.

In some demonstrative embodiments, device 120 may determine first location 111, for example, by determining a first distance between device 120 and device 140, when device 120 is at first location 111, e.g., as described above.

In some demonstrative embodiments, device 120 may determine second location 113, for example, by determining a second distance between device 120 and device 140, when device 120 is at second location 113, e.g., as described above.

In some demonstrative embodiments, device 120 may utilize the first distance and two or more other distances, e.g., between device 120 and two or more other stations, to determine first location 111; and device 120 may utilize the second distance and two or more other distances, e.g., between device 120 and two or more other stations, to determine second location 113, e.g., as described above.

In some demonstrative embodiments, device 120 may determine the first distance and the second distance at a relatively high accuracy level, for example, by performing FTM procedure 200 (FIG. 2) for determining the first distance and the second distance. However, performing FTM procedure 200 (FIG. 2) may consume an increased amount of power from device 120 and/or device 140.

Accordingly, performing a relatively large number of FTM procedures 200 (FIG. 2), for example, when mobile device 120 is in motion, may significantly increase the power consumption of device 120 and/or device 140.

In some demonstrative embodiments, device 120 may not be able to perform one or more FTM procedures 200 (FIG. 2) with device 140. For example, FTM procedure 200 (FIG. 2) may require computation resources at both of devices 120 and 140. In some situations device 140 may not have resources available for performing FTM procedure 200 (FIG. 2), for example, if device 140 performs the functionality of an AP in a dense environment, e.g., a stadium environment, in which device 140 is heavily loaded with location requests.

Some demonstrative embodiments may enable determining second location 113 at a relatively high accuracy level, for example, without performing FTM procedure 200 (FIG. 2) at second location 113.

In some demonstrative embodiments, device 120 may determine second location 113 using an active scan procedure, e.g., as described below.

Figure 3:
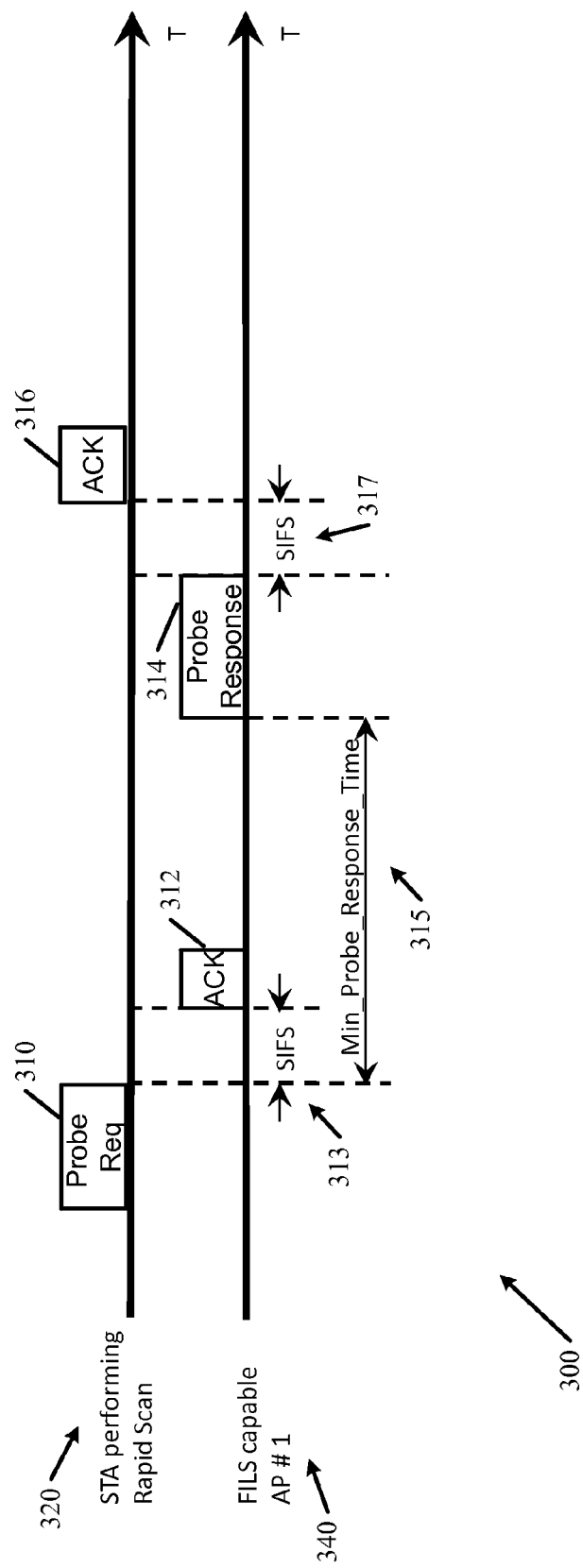
FIG. 3 is a schematic timing diagram of operations and interactions between a mobile device and a wireless communication device, in accordance with some demonstrative embodiments.

Reference is made to FIG. 3, which schematically illustrates a timing diagram 300, which demonstrates operations and interactions between a mobile device 320 and a wireless communication device 340, in accordance with some demonstrative embodiments. For example, mobile device 320 may perform the functionality of mobile device 120 (FIG. 1) and/or device 340 may perform the functionality of device 140 (FIG. 1).

In some demonstrative embodiments, timing diagram 300 may correspond to an active scan procedure between device 320 and device 340, for example, according to a unicast communication scheme.

As shown in FIG. 3, mobile device 320 may transmit a unicast probe request 310 to device 340, e.g., when device 320 is at a first location. For example, device 120 (FIG. 1) may transmit unicast probe request 310 to device 140 (FIG. 1), for example, when device 120 (FIG. 1) is at first location 111 (FIG. 1), e.g., as described above.

As shown in FIG. 3, device 340 may transmit an ACK message 312 to device 320, e.g., in response to unicast probe request 310, to confirm receipt of unicast probe request 310. For example, device 140 (FIG. 1) may transmit ACK message 312 to device 120 (FIG. 1).

As shown in FIG. 3, device 340 may transmit ACK message 312 after a time period 313, e.g., a SIFS, from receiving ACK message 312. For example, device 140 (FIG. 1) may transmit ACK message 312 a SIFS after receiving unicast probe request 310.

In some demonstrative embodiments, device 320 may utilize a ToA of ACK message 312 and a ToD of unicast probe request 310 to determine a round trip time between device 320 and 340.

In some demonstrative embodiments, device 320 may determine a first distance between device 320 and device 340 based on the round trip time, e.g., when device 320 is at the first location.

As shown in FIG. 3, device 340 may transmit a probe response 314 to device 340, e.g., when device 320 is at the first location. For example, device 320 (FIG. 1) may transmit probe response 314 to device 140 (FIG. 1).

As shown in FIG. 3, device 340 may transmit probe response 314, e.g., after a time period 315, e.g., a minimum probe response time, from receiving unicast probe request 310. For example, device 140 (FIG. 1) may transmit probe response 314 to device 120 (FIG. 1) after time period 315 from receiving unicast probe request 310.

As shown in FIG. 3, device 320 may transmit an ACK message 316 to device 340, e.g., in response to probe response 314, to confirm receipt of probe response 314. For example, device 120 (FIG. 1) may transmit ACK message 316 to device 140 (FIG. 1).

As shown in FIG. 3, device 320 may transmit ACK message 316 after a time period 317, e.g., SIFS, from receiving probe response 314. For example, device 140 (FIG. 1) may transmit ACK message 316 a SIFS after receiving probe response 314.

In some demonstrative embodiments, device 320 and device 340 may repeat performing the active scan procedure at a second location, a third location and/or additional locations, for example, to determine the second location, the third location and/or the additional locations, for example, based on the round trip time of unicast probe request 310 and ACK message 312, e.g., as described below.

Referring back to FIG. 1. in some demonstrative embodiments device 120 may determine second location 113 and/or one or more subsequent locations of device 120, e.g., subsequent to second location 113, based on first location 111, e.g., as described below.

In some demonstrative embodiments, device 120 may include a controller 114 configured to determine a location of device 120. For example, controller 114 may be coupled to transmitter 119 and receiver 121. Controller 114 may include an input and an output, for example, to interface wireless communication unit 112, transmitter 119, receiver 121 and/or any other element of device 120. In some demonstrative embodiments, controller 114 may be implemented as part of wireless communication unit 112. In other embodiments, controller 114 may be implemented as part of any other element of device 120.

In some demonstrative embodiments, wireless communication unit 112, e.g., transmitter 119, may transmit a first message to device 140, when device 120 is at first location 111. In one example, controller 114 may control wireless communication unit 112 to transmit the first message to device 140, when device 120 is at first location 111.

In some demonstrative embodiments, wireless communication unit 142 may receive the first message and may transmit a first acknowledgement (ACK) message to device 120, in response to the first message.

In some demonstrative embodiments, the first message may include a first probe request 310 (FIG. 3) and the first ACK may include a first ACK message 312 (FIG. 3) to acknowledge first probe request 310 (FIG. 3).

In other embodiments, the first message may include FTM request message 231 (FIG. 2) and the first ACK may include FTM request ACK 232 (FIG. 2) to acknowledge the request for FTM.

In some demonstrative embodiments, device 120, e.g., receiver 121, may receive the first ACK. Device 120 may determine a first round trip time based on the first message and the first ACK.

In some demonstrative embodiments, controller 114 may determine the first round trip time based on a difference between a time of arrival (ToA) of the first ACK and a time of departure (ToD) of the first message.

In one example, controller 114 may determine the first round trip time based on a difference between a TOA of first ACK message 312 (FIG. 3) and a ToD of first probe request 310 (FIG. 3), e.g., as described above.

In another example, controller 114 may determine the first round trip time based on a difference between a TOA of FTM request ACK 232 (FIG. 2) and a ToD of FTM request message 231 (FIG. 2), e.g., as described above.

In some demonstrative embodiments, controller 114 may determine a first distance between device 120 and device 140 based on the first round trip time.

For example, controller 114 may determine the first distance, denoted D1, by dividing the first round trip time, denoted RTT1, by two and multiplying the result by the speed of light, denoted c, e.g., as follows:

$$D1=(RTT1*C)/2 \quad (3)$$

In some demonstrative embodiments, the first distance may include an estimated distance between device 140 and device 120, e.g., when device 120 is at first location 111.

In some demonstrative embodiments, wireless communication unit 112, e.g., transmitter 119, may transmit a second message to device 140, when device 120 is at second location 113. In one example, controller 114 may control wireless communication unit 112 to transmit the second message to device 140, e.g., when device 120 is at second location 113.

In some demonstrative embodiments, wireless communication unit 142 may receive the second message and may transmit a second ACK message to device 120, in response to the second message.

In some demonstrative embodiments, the second message may include an unassociated unicast probe request.

In some demonstrative embodiments, wireless communication units 122 and 142 may communicate the second message and the second ACK message as part of an active scan procedure, e.g., as described above with reference to FIG. 3.

For example, the second message may include a second probe request 310 (FIG. 3) and the second ACK may include a second ACK message 312 (FIG. 3) to acknowledge second probe request 310 (FIG. 3).

In some demonstrative embodiments, device 120, e.g., receiver 121, may receive the second ACK. Device 120 may determine a second round trip time based on the second message and the second ACK.

In some demonstrative embodiments, controller 114 may determine the second round trip time based on a difference between a ToA of the second ACK and a ToD of the second message.

In some demonstrative embodiments, controller 114 may determine a second distance between device 120 and device 140 based on the second round trip time.

In one example, controller 114 may determine the second round trip time based on a difference between a TOA of second ACK message 312 (FIG. 3) and a ToD of second probe request 310 (FIG. 3), e.g., as described above.

In some demonstrative embodiments, controller 114 may determine a second distance between device 120 and device 140 based on the second round trip time.

For example, controller 114 may determine the second distance, denoted D2, by dividing the second round trip time, denoted RTT2, by two and multiplying the result by the speed of light, denoted c, e.g., as follows:

$$D2=(RTT2*C)/2 \quad (4)$$

In some demonstrative embodiments, the second distance may include an estimated distance between device 140 and device 120, e.g., when device 120 is at second location 113.

In some demonstrative embodiments, controller 114 may determine a distance difference between the first distance and the second distance.

In some demonstrative embodiments, controller 114 may determine second location 113 based on the distance difference and first location 111.

In one example, the first distance may be 5 meters, e.g., when device 120 is at first location 111, the second distance may be 8 meters, e.g., when device 120 is at second location 113. Accordingly, the distance difference may be 3 meters, e.g., 8−5=3. Accordingly, controller 114 may determine second location 113 to be at a distance of 3 meters from first location 111. For example, controller 114 may determine the second location to be at a distance of 8 meters from device 140, for example, if first location 111 is 5 meters from device 140, e.g., 5+3=8.

In some demonstrative embodiments, determining the distance difference may enable controller 114 to determine second location 113 at a relatively high accuracy level, for example, even if the first distance and the second distance are not accurate, e.g., compared to a distance calculated by performing FTM procedure 200 (FIG. 2).

In some demonstrative embodiments, the first distance may not be accurate due to a first delay between receiving the first message and transmitting the first ACK, which may result in an erroneous increase in the first distance. Accordingly, the first distance D1 may include a first real distance between device 120 and device 140, denoted Dr1, and a first error distance denoted De1, e.g., as follows:

$$D1=Dr1+De1 \quad (5)$$

In some demonstrative embodiments, the second distance may not be accurate due to a second delay between receiving the second message and transmitting the second ACK, which may result in an erroneous increase in the second distance. Accordingly, the second distance D2 may include a second real distance between device 120 and device 140, denoted Dr2, and a second error distance denoted De2, e.g., as follows:

$$D2=Dr2+De2 \quad (6)$$

In some demonstrative embodiments, the first and second delays may be a result of a relatively low accuracy of a local oscillator of device 140, a processing time of messages received by device 140, e.g., the first message and the second message, by a firmware and/or software of device 140, and/or a relatively low accuracy of a clock of device 140, which may change over time and/or with temperature.

In one example, the first and second delays may include a marginal tolerance of time period 313 (FIG. 3). For example, the first and second delay may include an actual time period between receiving unicast probe request 310 (FIG. 3) and transmitting ACK message 312 (FIG. 3), for example, a time period different from time period 313 (FIG. 3), e.g., different from a SIFS time period.

In some demonstrative embodiments, the first and the second delays may not affect the distance difference, denoted Dd, between the first distance and the second distance, for example, if the first delay and the second delay are substantially equal, e.g., as follows:

$$Dd=D2-D1=(Dr2+De2)-(Dr1+De1)=Dr2-Dr1 \quad (7)$$

Accordingly, the first and second delays may not affect the accuracy level of determining second location 113, for example, if the first delay and the second delay are substantially equal.

In some demonstrative embodiments, the first delay and the second delay may be substantially equal, for example, if a first time period for handling and/or processing the first message and transmitting the first ACK message is equal to a second time period for handling and/or processing the second message and transmitting the second ACK.

In some demonstrative embodiments, the first and second delays may be substantially equal, for example, if the first message and the second message are of the same type, same size, and/or having the same attributes, and/or the first ACK message and the second ACK message are of the same type, same size, and/or having the same attributes.

In one example, the first message and the second message may each include a probe request 310 (FIG. 3), and the first ACK message and the second ACK message may each include an ACK message 312 (FIG. 3), which are part of the active scan procedure, e.g., as described above with reference to FIG. 3.

In another example, the first and/or the second messages may include other types of messages, which have similar attributes and/or a similar processing time by device 140. For example, the first message may include FTM request 210 (FIG. 2), and the second message may include probe request 310 (FIG. 3), if FTM procedure 200 (FIG. 2) and the active scan procedure 300 (FIG. 3) have similar time delays, e.g., the marginal tolerance of the SIFS.

In one example, first location 111 may be at a distance of 25 meters from device 140. Controller 114 may determine the first distance to be 28 meters, e.g., when device 120 is at first location 111, for example, due to the first delay, which may add a first distance error of 3 meters. Controller 114 may determine the second distance to be 34 meters, e.g., when device 120 is at second location 111. The second distance may not be accurate, for example, due to the second delay, which may add a second distance error of 3 meters. Controller 114 may determine the distance difference between the first distance and the second distance to be 6 meters, e.g., 34−28=6. Accordingly, controller 114 may determine second location 113 based on first location 111 and the distance difference to be at a distance of 31 meters from device 140, e.g., 25+6=31. controller 114 may determine second location 113 at a relatively high accuracy level, for example, if the first and second delays are substantially equal, e.g., as described above.

In some demonstrative embodiments, controller 114 may determine at least one additional location of device 120, e.g., different from first location 111 and/or second location 113, based on first location 111 and a distance difference between the first distance, e.g., when device 120 is at first location 111, and an additional distance, e.g., measured when device 120 is at the additional location.

In some demonstrative embodiments, device 120 may be moved from second location 113 to a third location 115, e.g., by the user of device 120.

In some demonstrative embodiments, controller 114 may determine third location 115 based on first location 111 and a distance difference between the first distance, e.g., when device 120 is at first location 111, and a third distance to be measured, for example, when device 120 is at third location 115, e.g., as described below.

In some demonstrative embodiments, controller 114 may control wireless communication unit 122 to transmit a third message to device 140 and to receive a third ACK message from device 140 in response to the third message, e.g., when device 120 is at third location 115.

In some demonstrative embodiments, controller 114 may determine a third round trip time based on the third message and the third ACK, e.g., as described above.

In some demonstrative embodiments, controller 114 may determine the third distance based on the third round trip time, e.g., as described above.

In some demonstrative embodiments, the third distance may include an estimated distance between third location 113 and device 140, e.g., as described above.

In some demonstrative embodiments, controller 114 may determine the distance difference between the first distance and the third distance.

In some demonstrative embodiments, controller 114 may determine third location 115 based on first location 111 and the distance difference between the first distance and the third distance, e.g., as described above.

In some demonstrative embodiments, controller 114 may determine first location 111 based on a relatively accurate measurement of a distance between first location 111 and device 140, for example, to enable determining second location 113, third location 115 and/or any other additional location, e.g., at a relatively high accuracy level, based on first location 111.

In one example, controller 114 may determine first location 111 based on FTM procedure 200 (FIG. 2), which may produce a relatively accurate estimation of the distance between device 120 and device 140.

In some demonstrative embodiments, controller 114 may control wireless communication unit 122 to exchange FTM messages between device 120 and device 140, e.g., when device 120 is at first location 111.

In some demonstrative embodiments, controller 114 may determine the first distance based on the messages of the FTM messages, e.g., as described above.

In another example, controller 114 may determine first location 111 based on any other accurate location measurement procedure, which may enable determining first location 111 at a relatively high accuracy level. For example, controller 114 may determine first location 111 based on a known location of device 120, based on a previous known location of device 120, based on an input from the user of device 120 specifying an accurate location of device 120 and/or the like.

In some demonstrative embodiments, determining second location 113 and/or third location 115 based on the first, second and/or third messages and the first, second and/or third ACK messages may enable reduced power consumption of device 120 and/or 140, for example, compared to the power consumption for determining second location 113 and third location 115 based on FTM procedure 200 (FIG. 2).

In some demonstrative embodiments, determining second location 113 and/or third location 115 based on the first, second and/or third messages and the first, second and/or third ACK messages may be relatively simple and relatively fast, for example, compared to determining second location 113 and third location 115 based on FTM procedure 200.

In some demonstrative embodiments, determining second location 113 and/or third location 115 based on the first, second and/or third messages and the first, second and/or third ACK messages may enable determining the second location 113 and/or third location 115, without requiring the computation resources of device 140, which are required for FTM procedure 200 (FIG. 2). Accordingly, determining second location 113 and/or third location 115 based on the first, second and/or third messages and the first, second and/or third ACK messages may enable determining the second location 113 and/or third location 115, for example, even when device 140 is not available to perform FTM procedure 200 (FIG. 2) and/or, when results of one or more measurements of FTM procedure 200 (FIG. 2) are not available at device 120.

Figure 4:
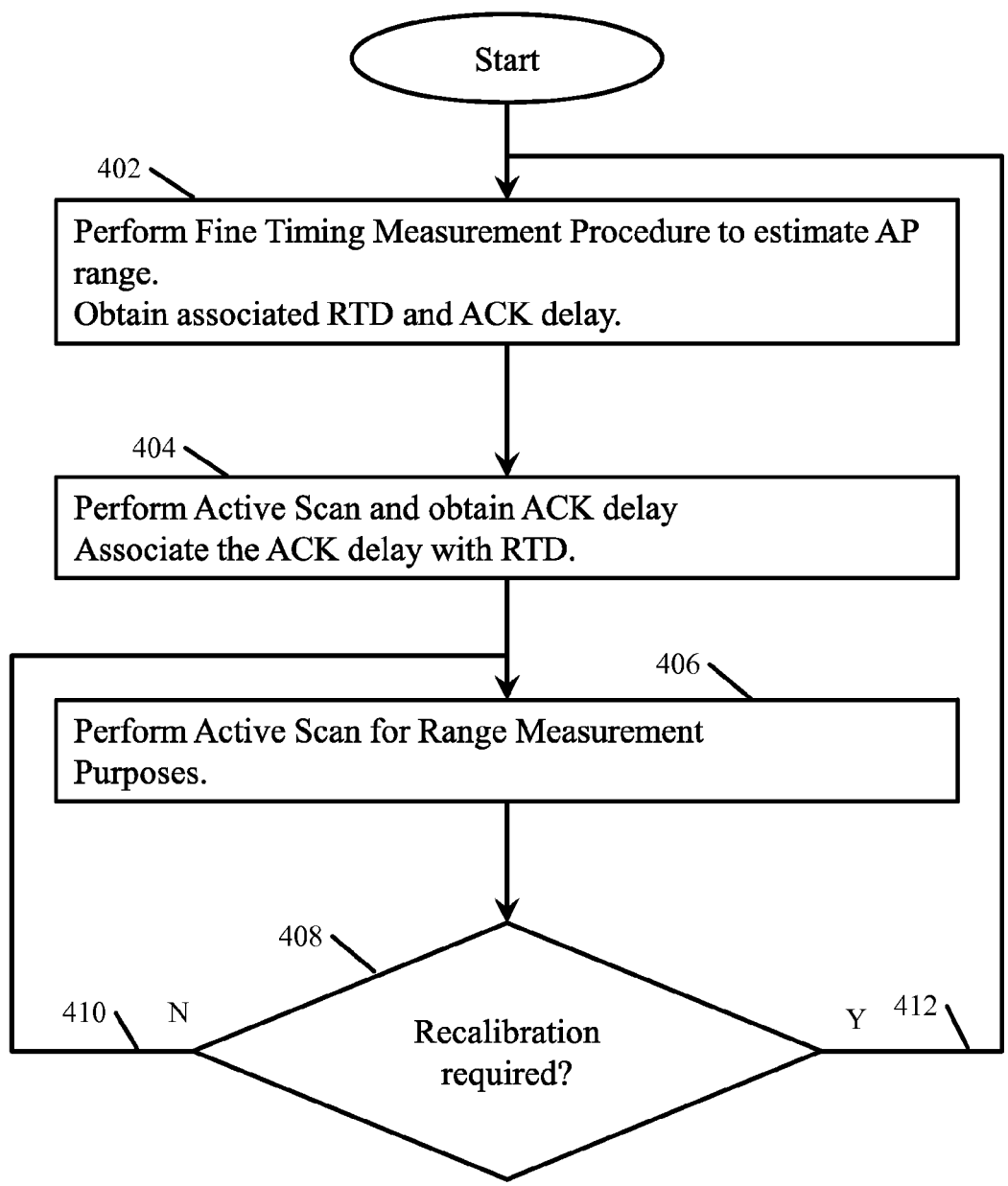
FIG. 4 is a schematic flow chart illustration of a method of estimating a location of a mobile device, in accordance with some demonstrative embodiments.

Reference is now made to FIG. 4, which schematically illustrates a method of estimating a location of a mobile device, in accordance with some demonstrative embodiments. For example, one or more of the operations of the method of FIG. 4 may be performed by a wireless communication system, e.g., system 100 (FIG. 1); a mobile device, e.g., device 120 (FIG. 1); a wireless communication device, e.g., device 140 (FIG. 1), a wireless communication unit, e.g., wireless communication units 122 and/or 142 (FIG. 1) and/or a controller, e.g., controller 114 (FIG. 1).

As indicated at block 402, the method may include performing an FTM procedure to estimate a range from an AP to a first location. For example, device 120 and device 140 (FIG. 1) may perform FTM procedure 200 (FIG. 2) to determine first location 111 (FIG. 1), e.g., as described above.

As indicated at block 404, the method may include performing an active scan and obtaining a round trip time including an ACK delay from the AP to the first location. For example, device 120 and device 140 (FIG. 1) may perform the active scan to determine the first round trip time, which includes the first delay, e.g., as described above.

As indicated at block 406, the method may include performing the active scan to determine a range from the AP to a second location. For example, device 120 and device 140

(FIG. 1) may perform the active scan to determine second location 113 (FIG. 1) based on first location 111 (FIG. 1), e.g., as described above.

As indicated at block 408, the method may include determining whether or not a recalibration of a round trip time is required. For example, controller 114 (FIG. 1) may determine whether or not a recalibration of the round trip time is required.

As indicated by arrow 410, the method may include continuing to perform the active scan to determine the range from the AP to other locations, for example, if the active scan provides a relatively accurate range. For example, device 120 and device 140 (FIG. 1) may perform the active scan to determine third location 115 (FIG. 1) based on first location 111 (FIG. 1), e.g., as described above.

As indicated by arrow 412, the method may include repeating the FTM procedure to estimate a range from an AP to an additional location, for example, if the active scan determines a non-accurate range. For example, device 120 and device 140 (FIG. 1) may repeat performing the FTM procedure, for example, if the active scan provides non-accurate distances.

In some demonstrative embodiments, the operations at block 404 may be unnecessary, for example, if performing the operation of obtaining an associated round trip time including an ACK delay during the FTM operation of block 402. For example, device 120 and device 140 (FIG. 1) may not perform the active scan operation at block 404, for example, if controller 114 (FIG. 1) determines the first round trip time based on the FTM request and the FTM ACK message, e.g., as described above.

Figure 5:
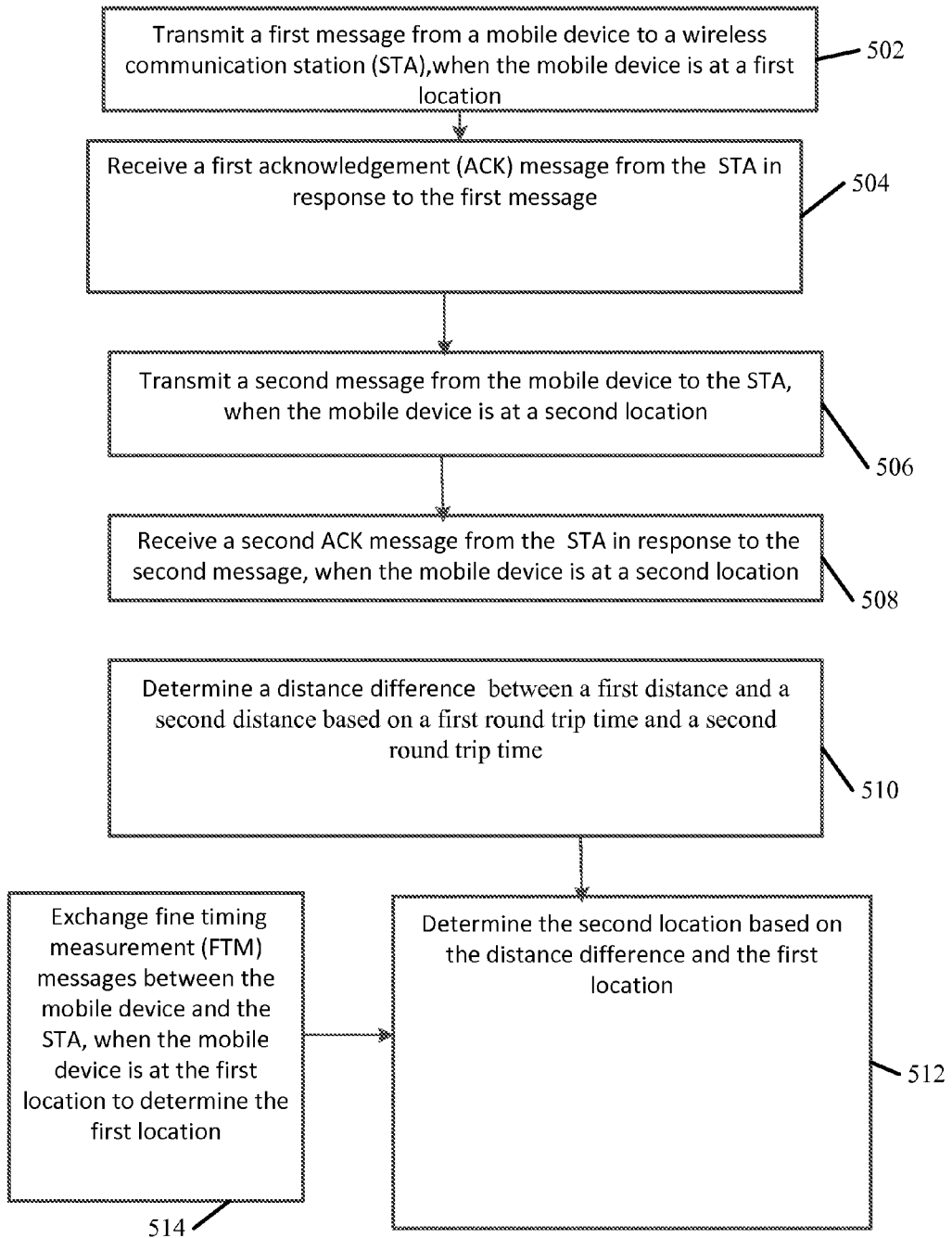
FIG. 5 is a schematic flow chart illustration of a method of estimating a location of a mobile device, in accordance with some demonstrative embodiments.

Reference is now made to FIG. 5, which schematically illustrates a method of estimating a location of a mobile device, in accordance with some demonstrative embodiments. For example, one or more of the operations of the method of FIG. 5 may be performed by a wireless communication system, e.g., system 100 (FIG. 1); a mobile device, e.g., device 120 (FIG. 1); a wireless communication device, e.g., device 140 (FIG. 1), a wireless communication unit, e.g., wireless communication units 122 and/or 142 (FIG. 1), and/or a controller, e.g., controller 114 (FIG. 1).

As indicated at block 502, the method may include transmitting a first message from a mobile device to a wireless communication station (STA), e.g., when the mobile device is at a first location. For example, device 120 (FIG. 1) may transmit the first message to device 140 (FIG. 1), e.g., as described above.

As indicated at block 504, the method may include receiving a first acknowledgement (ACK) message from the STA in response to the first message, e.g., when the mobile device is at the first location. For example, device 120 (FIG. 1) may receive the first ACK message from device 140 (FIG. 1), e.g., as described above.

As indicated at block 506, the method may include transmitting a second message from a mobile device to the STA, e.g., when the mobile device is at a second location. For example, device 120 (FIG. 1) may transmit the second message to device 140 (FIG. 1), e.g., as described above.

As indicated at block 508, the method may include receiving a second ACK message from the STA in response to the second message, e.g., when the mobile device is at the second location. For example, device 120 (FIG. 1) may receive the second ACK message from device 140 (FIG. 1), e.g., as described above.

As indicated at block 510, the method may include determining a distance difference between a first distance and a second distance based on a first round trip time and a second round trip time. The first round trip time may include a difference between a time of arrival (ToA) of the first ACK and a time of departure (ToD) of the first message, and the second round trip time may include a difference between a ToA of the second ACK and a ToD of the second message. For example, controller 114 (FIG. 1) may determine the distance difference between the first distance and the second distance, e.g., as described above.

As indicated at block 512, the method may include determining the second location based on the distance difference and the first location. For example, controller 114 (FIG. 1) may determine second location 113 (FIG. 1) based on the distance difference and first location 111 (FIG. 1), e.g., as described above.

As indicated at block 514, the method may include exchanging fine timing measurement (FTM) messages between the mobile device and the STA, e.g., when the mobile device is at the first location to determine the first location. For example, wireless communication units 122 and 142 (FIG. 1) may exchange the FTM messages to determine first location 111 (FIG. 1), e.g., as described above.

Figure 6:
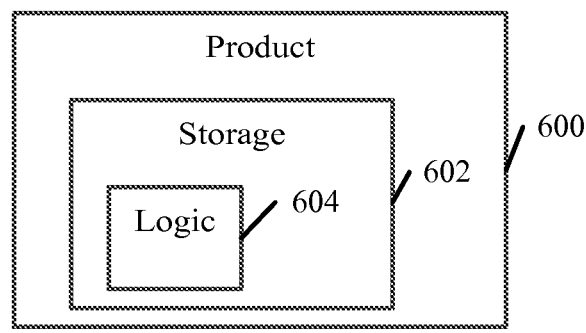
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 120 (FIG. 1), wireless communication unit 122 (FIG. 1), wireless communication unit 142 (FIG. 1), device 140 (FIG. 1), controller 114 (FIG. 1), and/or to perform one or more operations of the methods of FIGS. 4 and/or 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 includes an apparatus comprising a controller to control a mobile device to transmit a first message to a wireless communication station (STA) and to receive a first acknowledgement (ACK) message from the STA in response to the first message, when the mobile device is at a first location, wherein the controller to control the mobile device to transmit a second message to the STA and to receive a second ACK message from the STA in response to the second message, when the mobile device is at a second location, wherein the controller is to determine a distance difference between a first distance and a second distance based on a first round trip time and a second round trip time, the first distance being between the first location and the STA, the second distance being between the second location and the STA, wherein the first round trip time comprises a round trip time of the first message and the first ACK, and the second round trip time comprises a round trip time of the second message and the second ACK.

Example 2 includes the subject matter of Example 1, and optionally, wherein the first round trip time comprises a difference between a time of arrival (ToA) of the first ACK and a time of departure (ToD) of the first message, and the second round trip time comprises a difference between a ToA of the second ACK and a ToD of the second message.

Example 3 includes the subject matter of Example 1 or 2, and optionally, wherein the controller is to determine the second location based on the distance difference and the first location.

Example 4 includes the subject matter of any one of Examples 1-3, and optionally, wherein the second message comprises a probe request.

Example 5 includes the subject matter of Example 4, and optionally, wherein the controller is to control the mobile device to transmit the second message and receive the second ACK as part of an active scan procedure.

Example 6 includes the subject matter of Example 4 or 5, and optionally, wherein the second message comprises an unassociated unicast probe request.

Example 7 includes the subject matter of any one of Examples 4-6, and optionally, wherein the first message comprises a first probe request, the first ACK comprises an acknowledgement of the first probe request, the second message comprises a second probe request, and the second ACK comprises an acknowledgement of the second probe request.

Example 8 includes the subject matter of any one of Examples 1-6, and optionally, wherein the first message comprises a request for fine timing measurement (FTM), and the first ACK comprises an ACK to acknowledge the request for FTM.

Example 9 includes the subject matter of any one of Examples 1-8, and optionally, wherein the controller is to control the mobile device to exchange fine timing measurement (FTM) messages between the mobile device and the STA, when the mobile device is at the first location, and wherein the controller is to determine the first location based on the FTM messages.

Example 10 includes the subject matter of Example 9, and optionally, wherein the controller is to control the mobile device to transmit an FTM request to the STA, to receive an FTM request ACK from the STA, to receive a first FTM message from the STA, to transmit a first FTM ACK to the STA in response to the first FTM message, to receive a second FTM message from the STA, and to transmit a second FTM ACK to the STA in response to the second FTM message, and wherein the controller is to determine the distance between the first location and the STA based on a time of arrival (ToA) of the first FTM message, a time of departure (ToD) of the first FTM ACK, and timing information included in the second FTM message.

Example 11 includes the subject matter of any one of Examples 1-10, and optionally, wherein the controller is to control the mobile device to transmit a third message to the STA and to receive a third ACK message from the STA in response to the third message, when the mobile device is at a third location, and wherein the controller is to determine a distance difference between the first distance and a third distance based on the first round trip time and a third round trip time, the third distance being between the third location and the STA, and the third round trip time comprises a round trip time of the third message and the third ACK.

Example 12 includes the subject matter of any one of Examples 1-11, and optionally, wherein the STA comprises an Access Point (AP) a soft AP or a WiFi direct group owner.

Example 13 includes a system comprising a mobile device comprising a processor; a memory; at least one antenna; a wireless communication unit to communicate with a wireless communication station (STA) via the antenna; and a controller to control the wireless communication unit to transmit a first message to a wireless communication station (STA) and to receive a first acknowledgement (ACK) message from the STA in response to the first message, when the mobile device is at a first location, the controller to control the wireless communication unit to transmit a second message to the STA and to receive a second ACK message from the STA in response to the second message, when the mobile device is at a second location, wherein the controller is to determine a distance difference between a first distance and a second distance based on a first round trip time and a second round trip time, the first distance being between the first location and the STA, and the second distance being between the second location and the STA, wherein the first round trip time comprises a round trip time of the first message and the first ACK, and the second round trip time comprises a round trip time of the second message and the second ACK.

Example 14 includes the subject matter of Example 13, and optionally, wherein the first round trip time comprises a difference between a time of arrival (ToA) of the first ACK and a time of departure (ToD) of the first message, and the second round trip time comprises a difference between a ToA of the second ACK and a ToD of the second message.

Example 15 includes the subject matter of Example 13 or 14, and optionally, wherein the controller is to determine the second location based on the distance difference and the first location.

Example 16 includes the subject matter of any one of Examples 13-15, and optionally, wherein the second message comprises a probe request.

Example 17 includes the subject matter of Example 16, and optionally, wherein the controller is to control the mobile device to transmit the second message and receive the second ACK as part of an active scan procedure.

Example 18 includes the subject matter of Example 16 or 17, and optionally, wherein the second message comprises an unassociated unicast probe request.

Example 19 includes the subject matter of any one of Examples 16-18, and optionally, wherein the first message comprises a first probe request, the first ACK comprises an acknowledgement of the first probe request, the second message comprises a second probe request, and the second ACK comprises an acknowledgement of the second probe request.

Example 20 includes the subject matter of any one of Examples 13-18, and optionally, wherein the first message comprises a request for fine timing measurement (FTM), and the first ACK comprises an ACK to acknowledge the request for FTM.

Example 21 includes the subject matter of any one of Examples 13-20, and optionally, wherein the controller is to control the mobile device to exchange fine timing measurement (FTM) messages between the mobile device and the STA, when the mobile device is at the first location, and wherein the controller is to determine the first location based on the FTM messages.

Example 22 includes the subject matter of Example 21, and optionally, wherein the controller is to control the mobile device to transmit an FTM request to the STA, to receive an FTM request ACK from the STA, to receive a first FTM message from the STA, to transmit a first FTM ACK to the STA in response to the first FTM message, to receive a second FTM message from the STA, and to transmit a second FTM ACK to the STA in response to the second FTM message, and wherein the controller is to determine the distance between the first location and the STA based on a time of arrival (ToA) of the first FTM message, a time of departure (ToD) of the first FTM ACK, and timing information included in the second FTM message.

Example 23 includes the subject matter of any one of Examples 13-22, and optionally, wherein the controller is to control the mobile device to transmit a third message to the STA and to receive a third ACK message from the STA in response to the third message, when the mobile device is at a third location, and wherein the controller is to determine a distance difference between the first distance and a third distance based on the first round trip time and a third round trip time, the third distance being between the third location and the STA, and the third round trip time comprises a round trip time of the third message and the third ACK.

Example 24 includes the subject matter of any one of Examples 13-23, and optionally, wherein the STA comprises an Access Point (AP) a soft AP or a WiFi direct group owner.

Example 25 includes a method comprising transmitting a first message from a mobile device to a wireless communication station (STA) and receiving a first acknowledgement (ACK) message from the STA in response to the first message, when the mobile device is at a first location; transmitting a second message from the mobile device to the STA and receiving a second ACK message from the STA in response to the second message, when the mobile device is at a second location; and determining a distance difference between a first distance and a second distance based on a first round trip time and a second round trip time, the first distance being between the first location and the STA, and the second distance being between the second location and the STA, wherein the first round trip time comprises a round trip time of the first message and the first ACK, and the second round trip time comprises a round trip time of the second message and the second ACK.

Example 26 includes the subject matter of Example 25, and optionally, wherein the first round trip time comprises a difference between a time of arrival (ToA) of the first ACK and a time of departure (ToD) of the first message, and the second round trip time comprises a difference between a ToA of the second ACK and a ToD of the second message.

Example 27 includes the subject matter of Example 25 or 26, and optionally, comprising determining the second location based on the distance difference and the first location.

Example 28 includes the subject matter of any one of Examples 25-27, and optionally, wherein the second message comprises a probe request.

Example 29 includes the subject matter of Example 28, and optionally, comprising transmitting the second message and receiving the second ACK as part of an active scan procedure.

Example 30 includes the subject matter of Example 28 or 29, and optionally, wherein the second message comprises an unassociated unicast probe request.

Example 31 includes the subject matter of any one of Examples 28-30, and optionally, wherein the first message comprises a first probe request, the first ACK comprises an acknowledgement of the first probe request, the second message comprises a second probe request, and the second ACK comprises an acknowledgement of the second probe request.

Example 32 includes the subject matter of any one of Examples 25-30, and optionally, wherein the first message comprises a request for fine timing measurement (FTM), and the first ACK comprises an ACK to acknowledge the request for FTM.

Example 33 includes the subject matter of any one of Examples 25-32, and optionally, comprising exchanging fine timing measurement (FTM) messages between the mobile device and the STA, when the mobile device is at the first location, and determining the first location based on the FTM messages.

Example 34 includes the subject matter of Example 33, and optionally, comprising transmitting an FTM request to the STA; receiving an FTM request ACK from the STA; receiving a first FTM message from the STA; transmitting a first FTM ACK to the STA in response to the first FTM message; receiving a second FTM message from the STA; transmitting a second FTM ACK to the STA in response to the second FTM message; and determining the distance between the first location and the STA based on a time of arrival (ToA) of the first FTM message, a time of departure (ToD) of the first FTM ACK, and timing information included in the second FTM message.

Example 35 includes the subject matter of any one of Examples 25-34, and optionally, comprising transmitting a third message to the STA and receiving a third ACK message from the STA in response to the third message, when the mobile device is at a third location; and determining a distance difference between the first distance and a third distance based on the first round trip time and a third round trip time, the third distance being between the third location and the STA, and the third round trip time comprises a round trip time of the third message and the third ACK.

Example 36 includes the subject matter of any one of Examples 25-35, and optionally, wherein the STA comprises an Access Point (AP) a soft AP or a WiFi direct group owner.

Example 37 includes a product including a non-transitory storage medium having stored thereon instructions that, when executed by a machine, result in transmitting a first message from a mobile device to a wireless communication station (STA) and receiving a first acknowledgement (ACK) message from the STA in response to the first message, when the mobile device is at a first location; transmitting a second message from the mobile device to the STA and receiving a second ACK message from the STA in response to the second message, when the mobile device is at a second location; and determining a distance difference between a first distance and a second distance based on a first round trip time and a second round trip time, the first distance being between the first location and the STA, and the second distance being between the second location and the STA, wherein the first round trip time comprises a round trip time of the first message and the first ACK, and the second round trip time comprises a round trip time of the second message and the second ACK.

Example 38 includes the subject matter of Example 37, and optionally, wherein the first round trip time comprises a difference between a time of arrival (ToA) of the first ACK and a time of departure (ToD) of the first message, and the second round trip time comprises a difference between a ToA of the second ACK and a ToD of the second message.

Example 39 includes the subject matter of Example 37 or 38, and optionally, wherein the instructions result in determining the second location based on the distance difference and the first location.

Example 40 includes the subject matter of any one of Examples 37-39, and optionally, wherein the second message comprises a probe request.

Example 41 includes the subject matter of Example 40, and optionally, wherein the instructions result in transmitting the second message and receiving the second ACK as part of an active scan procedure.

Example 42 includes the subject matter of Example 40 or 41, and optionally, wherein the second message comprises an unassociated unicast probe request.

Example 43 includes the subject matter of any one of Examples 40-42, and optionally, wherein the first message comprises a first probe request, the first ACK comprises an acknowledgement of the first probe request, the second message comprises a second probe request, and the second ACK comprises an acknowledgement of the second probe request.

Example 44 includes the subject matter of any one of Examples 37-42, and optionally, wherein the first message comprises a request for fine timing measurement (FTM), and the first ACK comprises an ACK to acknowledge the request for FTM.

Example 45 includes the subject matter of any one of Examples 37-44, and optionally, wherein the instructions result in exchanging fine timing measurement (FTM) messages between the mobile device and the STA, when the mobile device is at the first location, and determining the first location based on the FTM messages.

Example 46 includes the subject matter of Example 45, and optionally, wherein the instructions result in transmitting an FTM request to the STA; receiving an FTM request ACK from the STA; receiving a first FTM message from the STA; transmitting a first FTM ACK to the STA in response to the first FTM message; receiving a second FTM message from the STA; transmitting a second FTM ACK to the STA in response to the second FTM message; and determining the distance between the first location and the STA based on a time of arrival (ToA) of the first FTM message, a time of departure (ToD) of the first FTM ACK, and timing information included in the second FTM message.

Example 47 includes the subject matter of any one of Examples 37-46, and optionally, wherein the instructions result in transmitting a third message to the STA and receiving a third ACK message from the STA in response to the third message, when the mobile device is at a third location; and determining a distance difference between the first distance and a third distance based on the first round trip time and a third round trip time, the third distance being between the third location and the STA, and the third round trip time comprises a round trip time of the third message and the third ACK.

Example 48 includes the subject matter of any one of Examples 37-47, and optionally, wherein the STA comprises an Access Point (AP) a soft AP or a WiFi direct group owner.

Example 49 includes an apparatus comprising means for transmitting a first message from a mobile device to a wireless communication station (STA) and receiving a first acknowledgement (ACK) message from the STA in response to the first message, when the mobile device is at a first location; means for transmitting a second message from the mobile device to the STA and receiving a second ACK message from the STA in response to the second message, when the mobile device is at a second location; and means for determining a distance difference between a first distance and a second distance based on a first round trip time and a second round trip time, the first distance being between the first location and the STA, and the second distance being between the second location and the STA, wherein the first round trip time comprises a round trip time of the first message and the first ACK, and the second round trip time comprises a round trip time of the second message and the second ACK.

Example 50 includes the subject matter of Example 49, and optionally, wherein the first round trip time comprises a difference between a time of arrival (ToA) of the first ACK and a time of departure (ToD) of the first message, and the second round trip time comprises a difference between a ToA of the second ACK and a ToD of the second message.

Example 51 includes the subject matter of Example 49 or 50, and optionally, comprising means for determining the second location based on the distance difference and the first location.

Example 52 includes the subject matter of any one of Examples 49-51, and optionally, wherein the second message comprises a probe request.

Example 53 includes the subject matter of Example 52, and optionally, comprising means for transmitting the second message and receiving the second ACK as part of an active scan procedure.

Example 54 includes the subject matter of Example 52 or 53, and optionally, wherein the second message comprises an unassociated unicast probe request.

Example 55 includes the subject matter of any one of Examples 52-54, and optionally, wherein the first message comprises a first probe request, the first ACK comprises an acknowledgement of the first probe request, the second message comprises a second probe request, and the second ACK comprises an acknowledgement of the second probe request.

Example 56 includes the subject matter of any one of Examples 49-54, and optionally, wherein the first message comprises a request for fine timing measurement (FTM), and the first ACK comprises an ACK to acknowledge the request for FTM.

Example 57 includes the subject matter of any one of Examples 49-56, and optionally, comprising means for exchanging fine timing measurement (FTM) messages between the mobile device and the STA, when the mobile device is at the first location, and determining the first location based on the FTM messages.

Example 58 includes the subject matter of Example 57, and optionally, comprising means for transmitting an FTM request to the STA; receiving an FTM request ACK from the STA; receiving a first FTM message from the STA; transmitting a first FTM ACK to the STA in response to the first FTM message; receiving a second FTM message from the STA; transmitting a second FTM ACK to the STA in response to the second FTM message; and determining the distance between the first location and the STA based on a time of arrival (ToA) of the first FTM message, a time of departure (ToD) of the first FTM ACK, and timing information included in the second FTM message.

Example 59 includes the subject matter of any one of Examples 49-58, and optionally, comprising means for transmitting a third message to the STA and receiving a third ACK message from the STA in response to the third message, when the mobile device is at a third location; and determining a distance difference between the first distance and a third distance based on the first round trip time and a third round trip time, the third distance being between the third location and the STA, and the third round trip time comprises a round trip time of the third message and the third ACK.

Example 60 includes the subject matter of any one of Examples 49-59, and optionally, wherein the STA comprises an Access Point (AP) a soft AP or a WiFi direct group owner.

Example 61 includes a system of wireless communication, the system comprising a mobile device comprising a processor; a memory; at least one antenna; a transmitter; a receiver; and a controller coupled to the transmitter and to the receiver; when the mobile device is at a first location, the transmitter to wirelessly transmit a first message to a wireless communication station (STA) and the receiver to wirelessly receive a first acknowledgement (ACK) message from the STA in response to the first message, when the mobile device is at a second location, the transmitter to wirelessly transmit a second message to the STA and the receiver to wirelessly receive a second ACK message from the STA in response to the second message, the controller to determine a distance difference between a first distance and a second distance based on a first round trip time and a second round trip time, the first distance being between the first location and the STA, the second distance being between the second location and the STA, wherein the first round trip time comprises a round trip time of the first message and the first ACK, and the second round trip time comprises a round trip time of the second message and the second ACK.

Example 62 includes the subject matter of Example 61, and optionally, wherein the first round trip time comprises a difference between a time of arrival (ToA) of the first ACK and a time of departure (ToD) of the first message, and the second round trip time comprises a difference between a ToA of the second ACK and a ToD of the second message.

Example 63 includes the subject matter of Example 61, and optionally, wherein the controller is to determine the second location based on the distance difference and the first location.

Example 64 includes the subject matter of Example 61, and optionally, wherein the second message comprises a probe request.

Example 65 includes the subject matter of Example 64, and optionally, wherein the transmitter is to transmit the second message, and the receiver is to receive the second ACK as part of an active scan procedure.

Example 66 includes the subject matter of Example 64, and optionally, wherein the second message comprises an unassociated unicast probe request.

Example 67 includes the subject matter of Example 64, and optionally, wherein the first message comprises a first probe request, the first ACK comprises an acknowledgement of the first probe request, the second message comprises a second probe request, and the second ACK comprises an acknowledgement of the second probe request.

Example 68 includes the subject matter of Example 61, and optionally, wherein the first message comprises a request for fine timing measurement (FTM), and the first ACK comprises an ACK to acknowledge the request for FTM.

Example 69 includes the subject matter of Example 61, and optionally, wherein the mobile device is to exchange fine timing measurement (FTM) messages between the mobile device and the STA, when the mobile device is at the first location, and wherein the controller is to determine the first location based on the FTM messages.

Example 70 includes the subject matter of Example 69, and optionally, wherein the transmitter is to transmit an FTM request to the STA, the receiver to receive an FTM request ACK from the STA, the receiver to receive a first FTM message from the STA, the transmitter to transmit a first FTM ACK to the STA in response to the first FTM message, the receiver to receive a second FTM message from the STA, and the transmitter to transmit a second FTM ACK to the STA in response to the second FTM message, and wherein the controller is to determine the distance between the first location and the STA based on a time of arrival (ToA) of the first FTM message, a time of departure (ToD) of the first FTM ACK, and timing information included in the second FTM message.

Example 71 includes the subject matter of any one of Examples 61-70, and optionally, wherein the transmitter to transmit a third message to the STA and the receiver to receive a third ACK message from the STA in response to the third message, when the mobile device is at a third location, and wherein the controller is to determine a distance difference between the first distance and a third distance based on the first round trip time and a third round trip time, the third distance being between the third location and the STA, and the third round trip time comprises a round trip time of the third message and the third ACK.

Example 72 includes the subject matter of any one of Examples 61-70, and optionally, wherein the STA comprises an Access Point (AP) a soft AP or a WiFi direct group owner.

Example 73 includes an apparatus of wireless communication, the apparatus comprising a controller; an input to the controller; an output from the controller; the controller to determine a distance difference between a first distance and a second distance based on a first round trip time and a second round trip time, wherein: the first distance is between a wireless mobile device at a first location and a wireless communication station (STA); the second distance is between the mobile device at a second location and the STA; the first round trip time comprises a round trip time of a first message and a first acknowledgement (ACK), the first message from the mobile device to the STA at the first location, the first ACK from the STA to the mobile device at the first location; and the second round trip time comprises a round trip time of a second message and a second acknowledgement (ACK), the second message from the mobile device to the STA at the second location, the second ACK from the STA to the mobile device at the second location.

Example 74 includes the subject matter of Example 73, and optionally, wherein the first round trip time comprises a difference between a time of arrival (ToA) of the first ACK and a time of departure (ToD) of the first message, and the second round trip time comprises a difference between a ToA of the second ACK and a ToD of the second message.

Example 75 includes the subject matter of Example 73, and optionally, wherein the controller is to determine the second location based on the distance difference and the first location.

Example 76 includes the subject matter of Example 73, and optionally, wherein the second message comprises a probe request.

Example 77 includes the subject matter of Example 76, and optionally, wherein second message and the second ACK are part of an active scan procedure.

Example 78 includes the subject matter of Example 76, and optionally, wherein the second message comprises an unassociated unicast probe request.

Example 79 includes the subject matter of Example 76, and optionally, wherein the first message comprises a first probe request, the first ACK comprises an acknowledgement of the first probe request, the second message comprises a second probe request, and the second ACK comprises an acknowledgement of the second probe request.

Example 80 includes the subject matter of Example 73, and optionally, wherein the first message comprises a request for fine timing measurement (FTM), and the first ACK comprises an ACK to acknowledge the request for FTM.

Example 81 includes the subject matter of Example 73, and optionally, wherein the controller is to determine the first location based on timing measurement (FTM) messages between the mobile device and the STA, when the mobile device is at the first location.

Example 82 includes the subject matter of Example 81, and optionally, wherein the controller is to determine the distance between the first location and the STA based on a time of arrival (ToA) of a first FTM message from the STA, a time of departure (ToD) of a first FTM ACK to the STA in response to the first FTM message, and timing information included in a second FTM message from the STA.

Example 83 includes the subject matter of any one of Examples 73-82, and optionally, wherein the controller is to determine a distance difference between the first distance and a third distance based on the first round trip time and a third round trip time, the third distance being between a third location and the STA, and the third round trip time comprises a round trip time of a third message and a third ACK, the third message being from the mobile device to the STA, when the mobile device is at a third location, and the third ACK message being from the STA to the mobile device in response to the third message.

Example 84 includes the subject matter of any one of Examples 73-82, and optionally, wherein the STA comprises an Access Point (AP) a soft AP or a WiFi direct group owner.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a controller to control a mobile device to transmit a first message to a wireless communication station (STA) and to receive a first acknowledgement (ACK) message from the STA in response to the first message, when the mobile device is at a first location; to transmit a second message to said STA and to receive a second ACK message from the STA in response to the second message, when the mobile device is at a second location; and to transmit a third message to said STA and to receive a third ACK message from the STA in response to the third message, when the mobile device is at a third location, wherein said controller is to determine a first distance difference between a first distance and a second distance based on a first round trip time and a second round trip time, and to determine a second distance difference between the first distance and a third distance based on the first round trip time and a third round trip time, said first distance being between said first location and said STA, said second distance being between said second location and said STA, and said third distance being between said third location and said STA, wherein the first round trip time comprises a round trip time of the first message and the first ACK, the second round trip time comprises a round trip time of the second message and the second ACK, and the third round trip time comprises a round trip time of the third message and the third ACK.

2. The apparatus of claim 1, wherein the first round trip time comprises a difference between a time of arrival (ToA) of the first ACK and a time of departure (ToD) of the first message, and the second round trip time comprises a difference between a ToA of the second ACK and a ToD of the second message.

3. The apparatus of claim 1, wherein said controller is to determine said second location based on said first distance difference and said first location.

4. The apparatus of claim 1, wherein said second message comprises a probe request.

5. The apparatus of claim 4, wherein said controller is to control said mobile device to transmit the second message and receive said second ACK as part of an active scan procedure.

6. The apparatus of claim 4, wherein said second message comprises an unassociated unicast probe request.

7. The apparatus of claim 4, wherein said first message comprises a first probe request, said first ACK comprises an acknowledgement of the first probe request, said second message comprises a second probe request, and said second ACK comprises an acknowledgement of the second probe request.

8. The apparatus of claim 1, wherein said first message comprises a request for fine timing measurement (FTM), and the first ACK comprises an ACK to acknowledge the request for FTM.

9. The apparatus of claim 1, wherein said controller is to control said mobile device to exchange fine timing measurement (FTM) messages between said mobile device and said STA, when said mobile device is at said first location, and wherein said controller is to determine said first location based on the FTM messages.

10. The apparatus of claim 9, wherein said controller is to control said mobile device to transmit an FTM request to said STA, to receive an FTM request ACK from said STA, to receive a first FTM message from said STA, to transmit a first FTM ACK to said STA in response to said first FTM message, to receive a second FTM message from said STA, and to transmit a second FTM ACK to said STA in response to said second FTM message, and wherein said controller is to determine the distance between the first location and the STA based on a time of arrival (ToA) of the first FTM message, a time of departure (ToD) of the first FTM ACK, and timing information included in the second FTM message.

11. The apparatus of claim 1, wherein said controller is to determine said third location based on said second distance difference and said first location.

12. The apparatus of claim 1, wherein said STA comprises an Access Point (AP) a soft AP or a WiFi direct group owner.

13. A system comprising:
a mobile device comprising:
   a processor;
   a memory;
   at least one antenna;
   a transmitter;
   a receiver; and
   a controller coupled to the transmitter and to the receiver;
   when the mobile device is at a first location, the transmitter to wirelessly transmit a first message to a wireless communication station (STA) and the receiver to wirelessly receive a first acknowledgement (ACK) message from the STA in response to the first message,
   when the mobile device is at a second location, the transmitter to wirelessly transmit a second message to said STA and the receiver to wirelessly receive a second ACK message from the STA in response to the second message,
   when the mobile device is at a third location, the transmitter to wirelessly transmit a third message to said STA and the receiver to wirelessly receive a third ACK message from the STA in response to the second message,
   the controller to determine a first distance difference between a first distance and a second distance based on a first round trip time and a second round trip time, and to determine a second distance difference between the first distance and a third distance based on the first round trip time and a third round trip time, said first distance being between said first location and said STA, said second distance being between said second location and said STA and said third distance being between said third location and said STA, wherein the first round trip time comprises a round trip time of the first message and the first ACK, the second round trip time comprises a round trip time of the second message and the second ACK, and the third round trip time comprises a round trip time of the third message and the third ACK.

14. The system of claim 13, wherein said second message comprises a probe request.

15. The system of claim 14, wherein said first message comprises a first probe request, said first ACK comprises an acknowledgement of the first probe request, said second message comprises a second probe request, and said second ACK comprises an acknowledgement of the second probe request.

16. The system of claim 13, wherein said first message comprises a request for fine timing measurement (FTM), and the first ACK comprises an ACK to acknowledge the request for FTM.

17. A method comprising:
transmitting a first message from a mobile device to a wireless communication station (STA) and receiving a first acknowledgement (ACK) message from the STA in response to the first message, when the mobile device is at a first location;
transmitting a second message from said mobile device to said STA and receiving a second ACK message from the STA in response to the second message, when the mobile device is at a second location;
transmitting a third message from said mobile device to said STA and receiving a third ACK message from the STA in response to the third message, when the mobile device is at a third location;
determining a first distance difference between a first distance and a second distance based on a first round trip time and a second round trip time, said first distance being between said first location and said STA, and said second distance being between said second location and said STA, wherein the first round trip time comprises a round trip time of the first message and the first ACK, and the second round trip time comprises a round trip time of the second message and the second ACK; and
determining a second distance difference between the first distance and a third distance based on the first round trip time and a third round trip time, said third distance being between said third location and said STA, and the third round trip time comprises a round trip time of the third message and the third ACK.

18. The method of claim 17, wherein said second message comprises a probe request.

19. The method of claim 17, wherein said first message comprises a request for fine timing measurement (FTM), and the first ACK comprises an ACK to acknowledge the request for FTM.

20. A product including a non-transitory storage medium having stored thereon instructions that, when executed by a machine, result in:
transmitting a first message from a mobile device to a wireless communication station (STA) and receiving a first acknowledgement (ACK) message from the STA in response to the first message, when the mobile device is at a first location;
transmitting a second message from said mobile device to said STA and receiving a second ACK message from the STA in response to the second message, when the mobile device is at a second location;
transmitting a third message from said mobile device to said STA and receiving a third ACK message from the STA in response to the third message, when the mobile device is at a third location;
determining a first distance difference between a first distance and a second distance based on a first round trip time and a second round trip time, said first distance being between said first location and said STA, and said second distance being between said second location and said STA, wherein the first round trip time comprises a round trip time of the first message and the first ACK, and the second round trip time comprises a round trip time of the second message and the second ACK; and
determining a second distance difference between the first distance and a third distance based on the first round trip time and a third round trip time, said third distance being between said third location and said STA, and the third round trip time comprises a round trip time of the third message and the third ACK.

21. The product of claim 20, wherein said second message comprises a probe request.

22. The product of claim 21, wherein said instructions result in transmitting the second message and receiving said second ACK as part of an active scan procedure.

23. The product of claim 21, wherein said second message comprises an unassociated unicast probe request.

24. The product of claim 20, wherein said first message comprises a request for fine timing measurement (FTM), and the first ACK comprises an ACK to acknowledge the request for FTM.

25. The product of claim 20, wherein said instructions result in determining said third location based on said second distance difference and said first location.

* * * * *